(12) United States Patent
Plantan et al.

(10) Patent No.: US 6,349,629 B1
(45) Date of Patent: Feb. 26, 2002

(54) BRAKE ACTUATOR

(75) Inventors: Ronald S. Plantan, Charlotte; Thomas O. Schultz, Davidson; Christopher J. Prager, Concorde; Michael M. Holm, Charlotte, all of NC (US); Gary R. Sprague, Rock Hill, SC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/650,095

(22) Filed: Aug. 25, 2000

(51) Int. Cl.$^7$ ................................................ F01B 19/00
(52) U.S. Cl. .......................................................... 92/99
(58) Field of Search ........................... 92/98 R, 99, 100

(56) References Cited

U.S. PATENT DOCUMENTS

| | | | | |
|---|---|---|---|---|
| 3,911,796 A | * | 10/1975 | Hull et al. ................... | 92/99 X |
| 4,860,640 A | * | 8/1989 | Ware .............................. | 92/63 |
| 4,960,036 A | | 10/1990 | Gummer et al. | |
| 5,992,297 A | | 11/1999 | Plantan et al. | |

* cited by examiner

*Primary Examiner*—John E. Ryznic
(74) *Attorney, Agent, or Firm*—Howard & Howard

(57) ABSTRACT

An improved diaphragm-type pneumatic brake actuator wherein the diaphragm is releasably secured to the piston as the diaphragm is inverted during actuation of the braking system of a vehicle thereby reducing wear of the flexible diaphragm and improving the performance of the brake actuator. In the disclosed embodiment, a rib or lip is formed on the surface of the diaphragm which receives the periphery of the piston as the diaphragm is inverted forming a mechanical interlock between the diaphragm and the piston thereby preventing spacing of the contact surface of the piston and the central portion of the diaphragm and frictional wear between the peripheral edge of the piston and the diaphragm. In the preferred embodiment, the piston includes an arcuate rim which extends away from the central portion of the diaphragm when the diaphragm is located in its extended cup-shaped position prior to actuation of the vehicle braking system and the diaphragm then conforms to the arcuate rim as the diaphragm is inverted and the diaphragm rib snaps over the piston rim as the diaphragm is inverted to actuate the vehicle braking system. The diaphragm rib may be molded on the surface of the diaphragm when the diaphragm is molded without any substantial increase in cost.

14 Claims, 3 Drawing Sheets

BRAKE ACTUATOR

FIELD AND BACKGROUND OF THE INVENTION

The present invention relates to an improved diaphragm-type pneumatic brake actuator for vehicle braking systems wherein the central portion of the cup-shaped diaphragm is maintained in surface contact with the contact surface of the piston during reciprocal movement of the diaphragm and piston, thereby reducing frictional wear of the diaphragm, extending the life of the diaphragm and providing improved performance of the brake actuator. A mechanical interlock is formed between the diaphragm and the piston adjacent the outer periphery of the piston during reciprocal movement of the piston and diaphragm as the diaphragm is inverted by pneumatic pressure during actuation of the brake actuator, eliminating the requirement for an adhesive.

Pneumatic brake actuators form part of the pneumatic braking system of commercial vehicles having a large gross vehicle weight, including trucks, buses and trailers requiring a braking system which responds rapidly with substantial braking power. A typical diaphragm-type pneumatic brake actuator includes a housing having cup-shaped housing members including opposed rim or flange portions, a flexible diaphragm which is cup-shaped in its relaxed condition including a central portion, a generally conical side wall which surrounds the central portion and a generally radial rim portion which extends between the rim portions of the housing members. A brake actuator further includes a piston having a contact surface which engages the central portion of the diaphragm and which reciprocates with the central and side wall portions of the diaphragm in response to pneumatic pressure changes on opposed sides of the diaphragm from a first position, wherein the diaphragm is extended to a cup-shape, to a second inverted position to actuate the vehicle braking system. The brake actuator is connected by pneumatic lines to the pneumatic braking system of the vehicle to actuate the brake actuator. The piston is operably connected to the braking system of the vehicle to actuate the vehicle brakes.

There are generally two components of a brake actuator system. The first component, commonly referred to as the service chamber, actuates the vehicle braking system under normal braking operation. The piston in the service chamber includes a generally flat head portion which engages the central portion of the diaphragm in the service chamber and a piston rod which extends through an end wall of the service chamber housing. When the brake is actuated by the vehicle operator, pneumatic pressure is received by the service chamber housing on the side of the diaphragm opposite the piston head, inverting the cup-shaped diaphragm and driving the piston rod through the end wall of the service chamber housing and actuating the braking system of the vehicle. When the vehicle operator releases the brake, a return spring located between the end wall of the service chamber housing and the piston head, returns the piston and diaphragm to a ready position.

A brake actuator system further includes an emergency or spring chamber having a power spring which actuates the braking system of the vehicle when the pneumatic pressure of the vehicle falls below a predetermined minimum or the parking brake is actuated by the vehicle operator. In a spring brake chamber, a power spring is located in the housing between the end wall and the piston. During normal operation of the vehicle, the pneumatic pressure from the vehicle is received in the spring chamber on the side of the cup-shaped diaphragm opposite the power spring and piston, thereby normally compressing the power spring. When the pneumatic pressure in the spring chamber falls below a predetermined minimum, the power spring expands and actuates the braking system of the vehicle.

The spring and service chambers may be combined in a "piggyback" assembly as disclosed, for example, in U.S. Pat. No. 4,960,036 assigned to the assignee of this application, wherein the assembly includes a central generally H-shaped flange case and the opposed ends of the flange case are enclosed by cup-shaped housing members to define a service chamber on one side of the flange case and a spring chamber on the opposed side of the flange case. A central opening in the web portion of the flange case receives a pushrod having a head portion biased against the central portion of the diaphragm in the service chamber opposite the piston and power spring, such that the pushrod is driven against the piston in the service chamber to actuate the vehicle braking system when the pressure in the spring chamber falls below a predetermined minimum pressure. Alternatively, the spring and service chambers may be utilized as separate components of the brake actuator system as is known in the prior art.

FIG. 1 illustrates the spring chamber 10 of a conventional dual diaphragm or piggyback pneumatic brake actuator. The assembly includes a generally H-shaped flange case 12 having a central web portion 14, an outer wall 16 and a radially extending flange 18. The spring chamber 10 is enclosed by a cover or head 20 having an end wall 22, a side wall 24 and a flange or skirt portion 26. The flange portion 26 includes a generally radially extending portion 28, an axially extending portion 30 and a radially inwardly extending lip 32 which is inelastically deformed as discussed further below. The spring chamber 10 further includes a flexible diaphragm 34 described above which includes a central portion 36, a side wall portion 38 and a radially extending rim portion 40. The preferred shape of the diaphragm radial rim portion is further described in U.S. Pat. No. 5,992,297 assigned to the assignee of this application. As described in the above-referenced U.S. Pat. No. 4,960,036, the diaphragm 34 is assembled on the flange case 12 with the radial rim portion 40 of the diaphragm overlying the flange portion 18 of the flange case 12. The head 20 is then assembled on the flange case with the radial portion 28 overlying the flange 18 of the flange case. The radial lip 32 is then deformed radially inwardly as shown, permanently securing the head 20 to the flange case 12. The radial rim portion 40 of the diaphragm is simultaneously compressed between the radial flange portions 18 and 28 of the flange case and head, respectively, forming sealed pneumatic chambers 42 and 44 on opposed sides of the diaphragm.

The spring chamber 10 further includes a piston 46 having a central portion 48 and an annular contact portion 50 having an annular contact surface 52 which normally engages the central portion 36 of the diaphragm. The spring chamber 10 further includes a powerful coiled power spring 58 which is compressed between the end wall 22 of the head and the radial portion 50 of the piston. A power spring and piston guide 60 centers the power spring 58 in the pneumatic chamber 44 and the guide 60 includes a rolled opening 62 which centers dome-shaped end of the piston 48 during operation of the brake actuator as further described below. The spring chamber 10 further includes a pushrod 64 which reciprocates through an opening 66 in the web portion 14 of the flange case as described below. The opening 66 includes annular seals (not shown) which prevent leakage between the pneumatic chambers 42 and 44. The pushrod 64 may either be spring biased against the central portion 36 of the diaphragm or affixed to the diaphragm as shown in FIG. 1. In the disclosed embodiment, the pushrod 64 includes a threaded end portion 68 which is received through an opening 70 in the central portion 36 of the diaphragm and secured to the diaphragm by nut 76. Leakage through the diaphragm opening 70 is prevented by washer 72 and conical washer 74.

The operation of the pneumatic brake actuator 10 shown in FIG. 1 may now be described. Pneumatic pressure or gas is received through opening 78 in the side wall 16 of the flange case, pressurizing pneumatic chamber 42. The gas pressure in pneumatic chamber 42 acts against the flexible diaphragm 34, compressing the coiled power spring 58 and driving the piston 46 upwardly in FIG. 1 to be received in the power spring and piston guide 60 as also shown in FIG. 3C described below. The flexible diaphragm is then cup-shaped and the side wall is frusto-conical or generally conical. When the pressure in the pneumatic chamber 42 falls below a predetermined minimum, which may occur as a result of a failure of the pneumatic braking system of the vehicle, the power spring 58 expands, driving the pushrod 64 through the opening 66 in the web portion 14 of the flange case 12, actuating the vehicle braking system. The chamber 24 further serves as a parking brake when the vehicle motor is turned off and the parking brake is actuated by the operator. In a dual-diaphragm or piggyback spring brake actuator partially shown in FIG. 1, the pushrod 64 includes an end plate 80 which engages the diaphragm in the service chamber 82 (not shown) which is driven against the piston in the service chamber 82 (not shown) actuating the vehicle braking system as described in the above-referenced U.S. Pat. No. 4,960,036. Alternatively, the pushrod 64 may be directly connected to the vehicle braking system where the spring chamber is separate from the service chamber. Other details of the construction and operation of a dual-diaphragm spring brake actuator may be found in the above-referenced U.S. Pat. No. 4,960,036.

A problem with any diaphragm-type brake actuator is diaphragm wear. As described, the diaphragm divides the brake actuator housing into two pneumatic chambers 42 and 44 on opposed sides of the diaphragm 34 and therefore the rim portion 40 must provide a seal between the chambers for operation of the brake actuator as described above. Thus, the diaphragm 34 is preferably formed of a rubber or rubber-like material, such as synthetic rubber, wherein the seal is provided by compressing the opposed flange portions 18 and 28 of the housing members against the generally radial rim portion 40 of the diaphragm to seal the chambers 42 and 44 on opposed sides of the diaphragm. However, the diaphragm must also be sufficiently rugged to permit repeated inversion of the cup-shaped diaphragm during braking of the vehicle. Therefore, a typical diaphragm includes a core of a synthetic fabric material, such as a nylon net surrounded by natural or synthetic rubber, such as neoprene. The synthetic rubber surfaces, however, wear during normal operation of the brake actuator, potentially resulting in leakage between the pneumatic chambers of the brake actuator.

A primary source of diaphragm wear in diaphragm-type pneumatic brake actuators is frictional wear between the piston 46 and the diaphragm. In conventional pneumatic brake actuators, the surface 52 of the piston which contacts the diaphragm has a width or diameter generally equal to the width or diameter of the center portion 36 of the diaphragm having a flat or rounded outer edge portion 54. However, when the cup-shaped diaphragm is inverted to actuate the vehicle braking system as shown in FIG. 1 and during return of the diaphragm to its extended cup-shape, the contact surface 52 is spaced from the central portion 36 of the diaphragm and the outer edge 54 of the piston rubs against the inside surface of the diaphragm as the diaphragm is inverted, resulting in frictional wear. This problem can be reduced by gluing the contact surface of the piston to the central portion of the diaphragm to prevent separation of the piston and the diaphragm; however, gluing or adhesive bonding is expensive and creates separate problems, including handling and disposal problems. Further, a brake actuator must be able to withstand extreme temperature and humidity variations during normal operation and the adhesive may fail. Wear of the diaphragm of a service chamber creates less of a problem because the diaphragm in the service chamber may be replaced. However, because of the dangers inherent in opening a spring chamber, the housing components 12 and 20 of the spring chamber are now permanently secured by crimping as shown in FIG. 1 to prevent tampering an d inadvertent opening of the spring chamber as described in the above-referenced U.S. Pat. No. 4,960,036. Therefore, the entire spring chamber assembly must be replaced if the diaphragm fails.

There has, therefore, been a longstanding need to reduce frictional wear between the piston and the diaphragm of a piston-type pneumatic brake actuator to increase the life of brake actuators of this type which does not require adhesive bonding. Another longstanding need is to increase the performance of the brake actuator to provide improved braking performance without increasing the size of the brake actuator. These and other problems have been solved by the improved brake actuator described below.

SUMMARY OF THE INVENTION

As set forth above, the improved diaphragm-type pneumatic brake actuator of this invention includes a mechanical interlock between the piston and the diaphragm, preferably located at or adjacent to the outer edge of the piston, which prevents separation of the piston and the diaphragm during inversion of the cup-shaped diaphragm, thereby reducing or eliminating wear between the outer edge of the piston and the diaphragm. In the most preferred embodiment of this invention, the diaphragm is releasably retained to the piston, such that the mechanical interlock is formed only during inversion of the cup-shaped diaphragm to simplify assembly and avoid wear of the components of the mechanical interlock. As described below, the mechanical interlock or locking means can take various forms and may be utilized to reduce wear of the diaphragm in the spring or emergency chamber and the service chamber, but a tamper-resistant spring chamber as described above and in the above-referenced U.S. Pat. No. 4,960,036, which is permanently sealed and therefore cannot be serviced, has the greatest present need. Further, the diaphragm in the spring chamber inverts under greater force because it is driven by the power spring resulting in greater wear of the diaphragm in the spring chamber.

As described above, the general construction of the improved pneumatic brake actuator for a vehicle braking system of this invention may be conventional. That is, the pneumatic brake actuator includes an enclosed housing having housing members including opposed flange or rim portions. The housing members are generally cup-shaped and the opposed rim portions generally include generally radially extending mating flange portions. In a tamper-resident spring brake actuator as described above, at least one of the flange portions forms a skirt which is inelastically deformed around the flange portion of the other housing member, permanently sealing the spring chamber. Alternatively, the spring brake chamber may be permanently sealed by a separate ring-shaped clamping element which is inelastically deformed around the flange portions of the housing members. However, the flange portions of the service chamber are generally secured by a conventional bolted clamp band and may thus be opened to replace the diaphragm.

The brake actuator further includes a flexible diaphragm which is cup-shaped in its extended position, as described above, including a central portion, a generally conical side wall portion which surrounds the central portion, and a generally radial outer rim portion received between the flange portions of the housing members and compressed to seal the pneumatic chambers formed on opposed sides of the flexible diaphragm. A conventional brake actuator further includes a piston having a contact surface normally in surface contact with the diaphragm center portion and an outer edge portion. As described above, the diaphragm center and side wall portions invert or partially invert and reciprocate with the piston in response to changes of pneumatic pressure in the pneumatic chambers formed on the opposed sides of the diaphragm from a first position, wherein the diaphragm is extended to generally a cup-shape as described above to a second inverted position to actuate the braking system of the vehicle.

In the preferred embodiment of the improved brake actuator of this invention, the diaphragm includes an integral radial lip or rib which receives the outer edge or surface of the piston and releasably retains the piston in face-to-face contact as the diaphragm is inverted or partially inverted from its extended cup-shape to a second inverted position during actuation of the vehicle braking system. The piston may be conventional in form, as shown in FIG. 1, wherein the contact portion 50 is flat. However, in the most preferred embodiment, the outer portion of the piston includes an arcuate rim which extends away from the center portion of the diaphragm when the diaphragm in the extended cup-shaped position. This configuration has several advantages. First, the piston and diaphragm are easier to assemble. Second, the piston outer edge does not engage the lip during normal operation of the vehicle until the braking system of the vehicle is actuated. Third, the diaphragm generally conforms to the arcuate shape of the contact surface including the arcuate rim as the diaphragm is inverted and the outer edge of the rim then firmly locks into the rim on the diaphragm in a rolling motion. In the inverted locked position, there is full face-to-face contact between the contact face of the piston and the center portion of the diaphragm avoiding wear of the diaphragm as described above. There are also unexpected advantages which were discovered during testing of this configuration. First, the reduction in wear allows the use of a thinner diaphragm, reducing the cost. More importantly, the interlock and particularly the improved piston configuration described results in improved performance of the brake actuator. This is because the interlocked piston and diaphragm assembly results in a greater effective area for the diaphragm, permitting either a reduction in the size of the brake actuator or increased performance with the same size of brake actuator.

As set forth above, the mechanical locking means between the piston and the central portion of the diaphragm can take several forms. For example, a circular or annular rib on the diaphragm may be received in a circular groove in the piston instead of mating with the outer edge of the piston as described below in regard to the most preferred embodiment. Further, the interlock may be reversed. That is, a circular rib may be provided on the contact surface of the piston which interlocks with either a rib, a plurality of ribs, or a groove on the mating surface of the diaphragm. To provide full face-to-face contact, however, the interlock is preferably located adjacent or near the outer edge of the piston.

As set forth above, the flexible diaphragm is generally cup-shaped having a central portion, a generally frusto-conical side wall portion, and a radial rim portion. The radial lip or rib in the most preferred embodiment is located on an inside surface adjacent the side wall portion of the diaphragm when the diaphragm is assembled into the brake actuator. However, when the diaphragm is inverted and extended by the pneumatic pressure to a cup-shape, the rib is located on an outer surface, adjacent where the side and end walls come together. In a most preferred embodiment, wherein the piston includes an arcuate upstanding rim described above, the lip on the diaphragm is located adjacent to the outer surface or edge of the piston if the rim were laid flat. This assures that the diaphragm will conform to the shape of the piston as the diaphragm inverts to actuate the vehicle braking system. Further, the lip or rib preferably includes a relatively steep edge to assure locking of the outer edge of the rim portion of the diaphragm and a rounded end to reduce friction.

Other advantages and meritorious features of the improved brake actuator of this invention will be more fully understood from the following description of the preferred embodiment, the appended claims, and the drawings; a brief description of which follows.

DETAILED DESCRIPTION OF A PREFERRED EMBODIMENT

Figure 1:
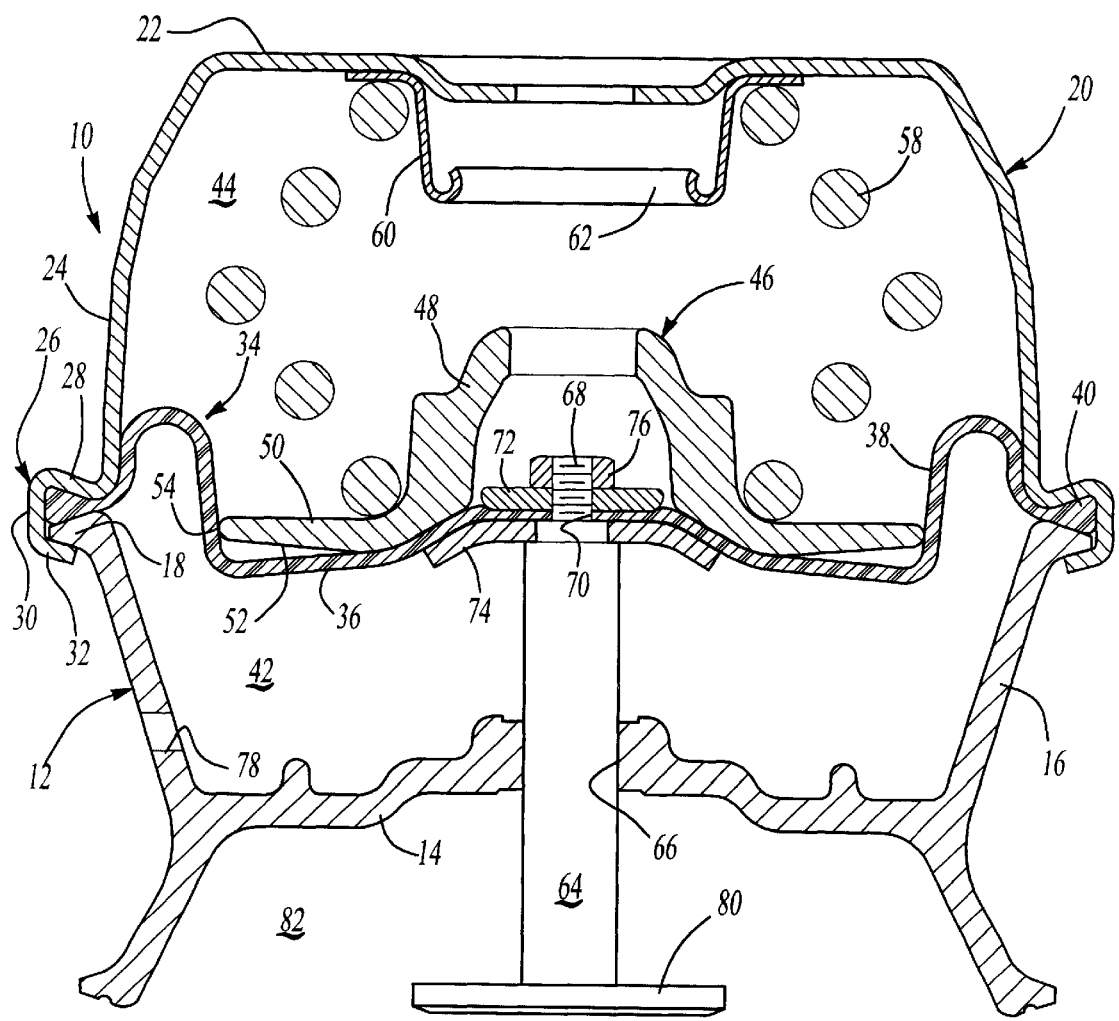
FIG. 1 is a partially cross-sectioned side view of the spring chamber of a conventional du al diaphragm spring brake actuator de scribed above.
Figure 2A:
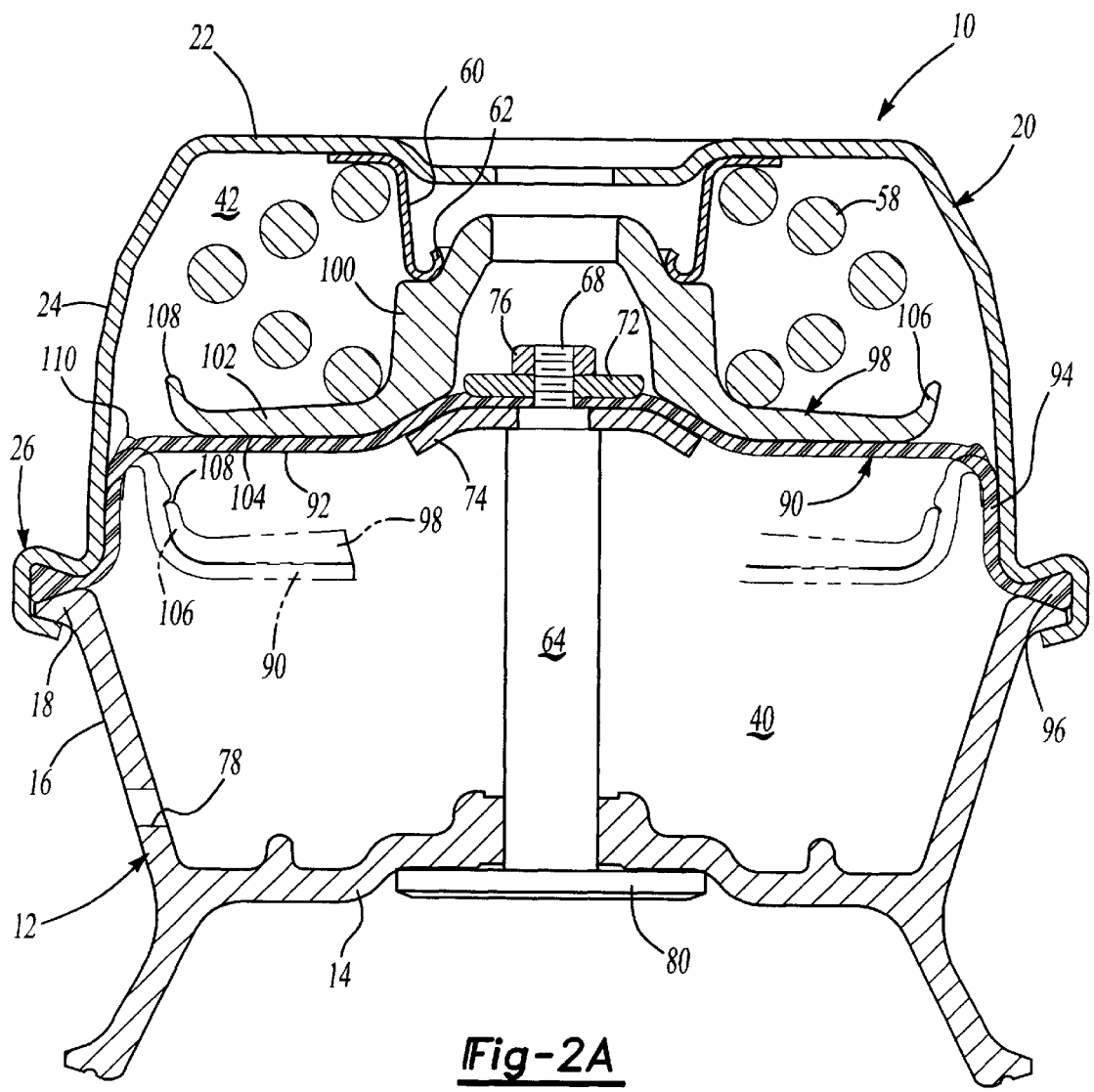
FIG. 2A is a side, partially cross sectioned view of the improved pneumatic brake actuator of this invention with the diaphragm extended by pneumatic pressure to a cup-shape and illustrating in phantom the inverted position of the diaphragm.

As set forth above, the general construction of the improved pneumatic brake actuator for a vehicle braking system of this invention may be conventional. That is, the improved mechanical interlock between the piston and the diaphragm may be utilized with conventional diaphragm-type brake actuators. FIG. 2A illustrates a spring brake actuator or chamber 10, as illustrated in FIG. 1 described above, including a flange case 12, a cover or head 20, a power spring 58 and a push rod 64. No further description of these components which are common to the conventional spring brake actuator shown in FIG. 1 are necessary.

In FIG. 2A, The flexible diaphragm 90 is in the extended cup-shaped position, ready for installation in the brake actuator. As shown and described above, the diaphragm includes a central portion 92, a side wall 94, which is generally conical, and a rim portion 96, which is received between and compressed by the flange portions 26 and 18 of the housing components forming a lower pneumatic chamber 40 and an upper pneumatic chamber 42 on opposed sides of the diaphragm. Pneumatic pressure is received through port 78 in the outer wall 16 of the flange case 12, pressurizing the pneumatic chamber 40, which acts against the flexible diaphragm 90 and the piston 98 to compress the power spring 58. The dome-shaped central portion 100 of the piston is then received in the rolled opening 62 in the power spring and piston guide 60, centering the piston as described above. The piston 98 further includes a contact portion 102 having an annular contact surface 104 which is in face-to-face contact with the central portion 92 of the diaphragm because the pressure in the pneumatic chamber 40 is generally equal to the force of the power spring 58.

In the disclosed preferred embodiment of the pneumatic brake actuator of this invention, the contact portion 102 of the piston 98 includes an arcuate upstanding lip or rim portion 106 having a rounded outer edge 110. As shown in FIG. 2A, the arcuate lip or rim portion 106 extends away from the central portion 92 of the diaphragm, such that the piston 98 is not affixed or connected to the diaphragm 90 in the extended position. The diaphragm further includes an integral annular rib or lip 110 which is generally adjacent to, but spaced from, the outer edge 108 of the piston, but which receives the outer edge 108 and forms a mechanical interlock as the diaphragm 90 inverts during actuation of the vehicle emergency or parking brake as shown in phantom in FIG. 2A and further described. The annular rib 110 is spaced from the outer edge 108 a distance equal to the length of the arcuate rim 106 if the rim were extended straight as described below.

Figure 2B:
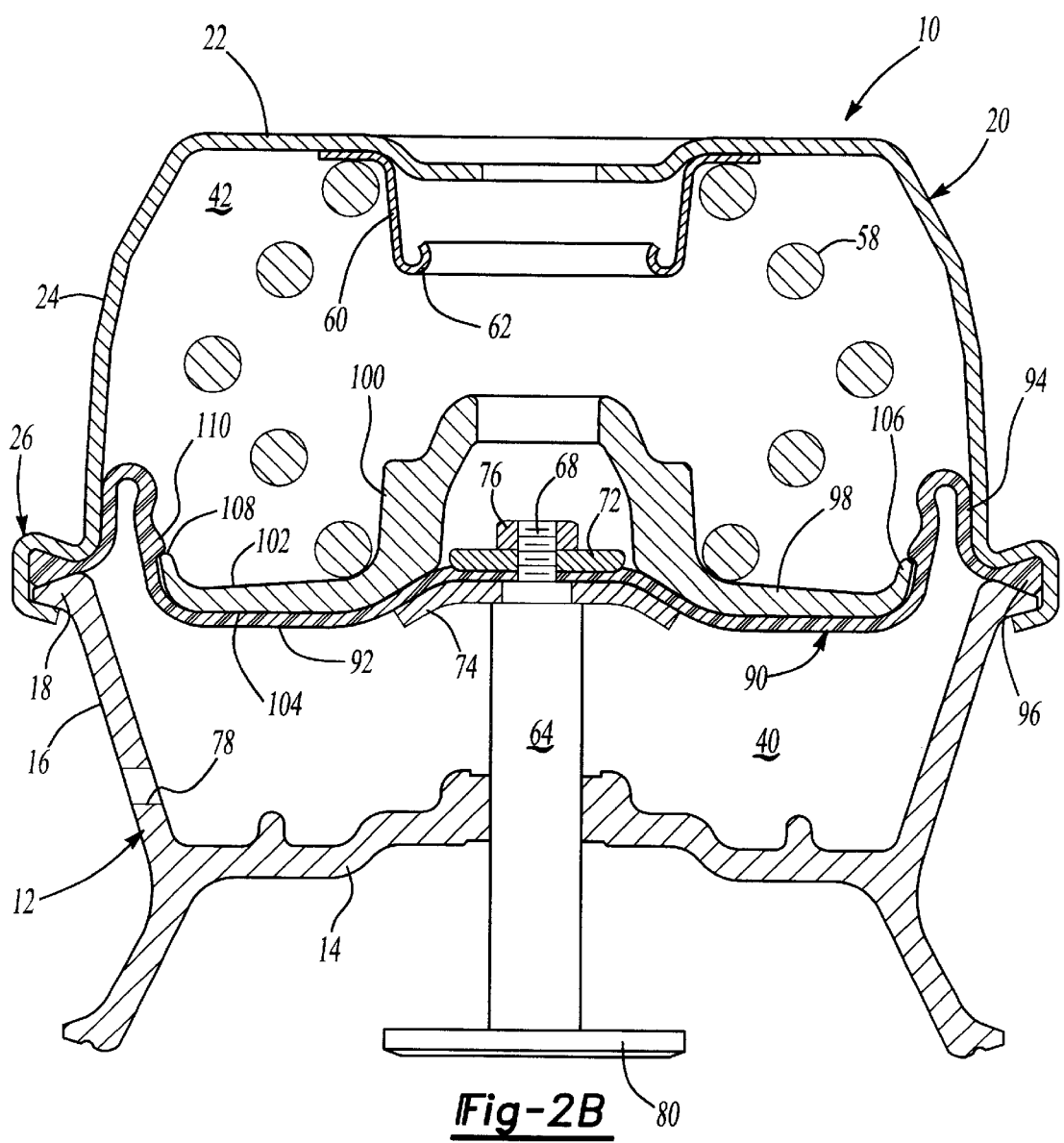
FIG. 2B is a side, partially cross sectioned view similar to FIG. 2A illustrating the inversion of the diaphragm during actuation of the vehicle braking system.

When the gas pressure in the pneumatic chamber 42 falls below a predetermined minimum, which may result from a failure of the pneumatic braking system of the vehicle, the power spring expands against the radial contact portion 102 of the piston 98, which inverts the central and side wall portions 92 and 94 respectively of the diaphragm 90 as shown in FIG. 2B. As the flexible diaphragm inverts under the force of the power spring 58, it conforms to the shape of the arcuate lip or rim 106 which increases the effective area of the diaphragm and therefore improves the performance of the brake actuator which can be confirmed by comparing FIGS. 2B and 1. Further, as the diaphragm is inverted as shown in FIG. 2B, the rounded outer edge 108 is received beneath the annular lip or rib 110 of the diaphragm, providing a mechanical interlock between the piston 98 and the diaphragm 90 and maintaining full face-to-face contact between the contact surface 104 of the piston and the diaphragm, reducing or eliminating wear of the diaphragm as described above in regard to FIG. 1. As will be understood from the above description of the operation of the pneumatic brake actuator, the expansion of the power spring 58 and inversion of the diaphragm central and side wall portions 92 and 94, respectively, drives the push rod 64 through the opening 66 in the web portion 14 of the flange case actuating the braking system of the vehicle.

Figure 3A:
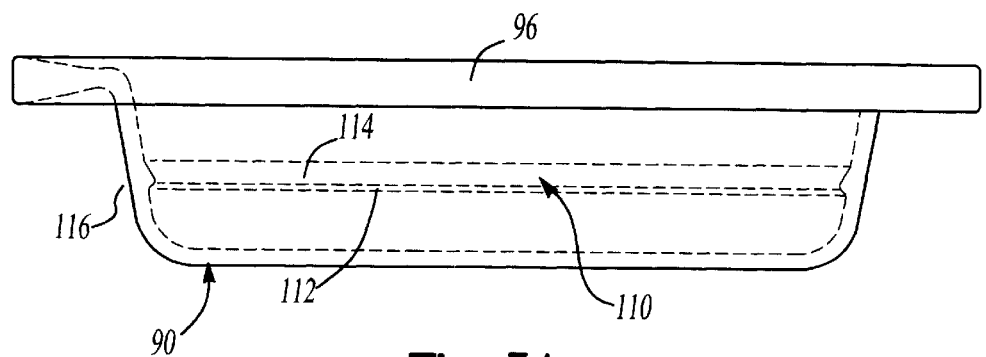
FIG. 3A is a side partially cross sectioned view of the improved flexible diaphragm of the brake actuator of the invention.
Figure 3B:
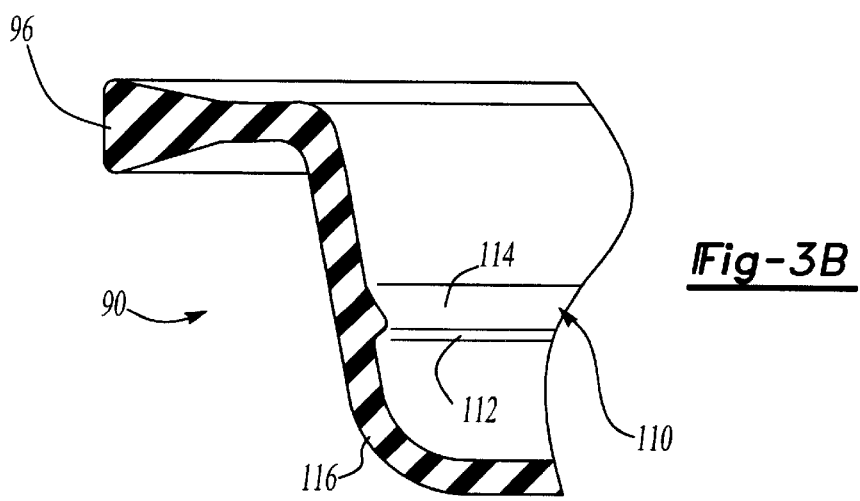
FIG. 3B is a cross sectional partial side enlarged view of the diaphragm illustrated in FIG. 3A.

FIGS. 3A and 3B illustrate a preferred embodiment of the diaphragm 90. As manufactured, the flexible diaphragm 90 is cup-shaped as described above. The annular lip or rib 110 is then located on the inside surface of the side wall 94 as shown in FIG. 3A. However, when the diaphragm is inverted as shown by the arrow in FIG. 2B, the annular rib 110 is located on the outside surface of the side wall 94 adjacent the junction of the side and end walls. FIG. 3B illustrates a preferred embodiment of the annular lip, which includes a sharply inclined surface 112, a gently inclined ramp surface 114 and a rounded edge 116. The sharply inclined surface 112 receives the rounded outer edge 108 of the piston and forms an interlock with the outer edge as described above. As will be understood, the annular lip or rib 110 may be molded on the diaphragm from the natural or synthetic rubber material which forms the outside layers of the diaphragm as described above.

As set forth above, the releasable mechanical interlock formed between the piston and the diaphragm as the diaphragm is inverted to actuate the vehicle braking system has several important advantages over the prior art including, but not limited to, reduction in the wear of the diaphragm. Although this improvement has particular advantages for a diaphragm-type spring brake actuator of the general type described above, the improvements provided by this invention may also be incorporated in the service chamber to reduce frictional wear of the diaphragm in the service chamber and improve performance. Further, the improved pneumatic piston-type brake actuator of this invention is not limited to any particular design of brake actuator. Also, as described above, the mechanical interlock or locking means described herein can take various forms and is not limited to the preferred embodiment described herein and shown in the drawings. Finally, although the locking rib or lip is preferably integral with the diaphragm or the piston as described above, the locking means may also be a separate element. Therefore, while the preferred embodiment of this invention has been described so as to enable a person of ordinary skill in this art to make and use this invention, the description of the preferred embodiment is intended to be exemplary only.

What is claimed is:

1. A pneumatic brake actuator for a vehicle braking system including a housing, a flexible diaphragm which is cup-shaped in its extended position including a central portion, a side wall portion surrounding said central portion and a generally radial outer rim portion secured in sealed relation to said housing, and a piston having a contact surface engaging said central portion of said diaphragm and a non-planar lip, said diaphragm central and side wall portions reciprocable with said piston in response to changes of pneumatic pressure on opposed sides of said diaphragm to actuate said vehicle braking system, and locking means mechanically interconnecting said non-planar lip of said piston to said diaphragm located adjacent an outer surface of said piston maintaining contact between said diaphragm central portion and said non-planar lip of said piston during reciprocal movement and reducing frictional wear of said diaphragm.

2. The pneumatic braking system defined in claim 1, wherein said locking means comprises an annular lip on one of said diaphragm and said piston which releasably retains said central portion of said diaphragm to said piston during said reciprocal movement of said piston and diaphragm.

3. The pneumatic braking system defined in claim 2, wherein said locking means comprises an annular lip on said diaphragm which engages and releasably secured to said outer surface of said piston.

4. The pneumatic brake actuator defined in claim 3, wherein said piston outer surface includes an arcuate annular lip portion, said arcuate annular lip portion of said piston curving away from said diaphragm central portion when said diaphragm is extended by pneumatic pressure in said housing to its extended cup-shape, but which follows the contour of said diaphragm as said diaphragm is inverted and which receives said diaphragm annular lip to releasably retain said diaphragm to said piston during said reciprocal movement.

5. The pneumatic brake actuator defined in claim 4, wherein said diaphragm annular lip is located on said conical side wall of said diaphragm.

6. The pneumatic brake actuator defined in claim 5, wherein said diaphragm annular lip is located on an outside surface of said diaphragm when said diaphragm is extended to said cup-shape.

7. The pneumatic brake actuator for a vehicle braking system comprising an enclosed housing including cup-shaped housing members having opposed rim portions, a flexible diaphragm, which is cup-shaped in its extended position including a central portion, a side wall surrounding said central portion and a rim portion extending between said rim portions of said housing members and secured therebetween in sealed relation, and a reciprocable piston having a contact surface in surface contact with said diaphragm central portion, said diaphragm central and side wall portions reciprocable with said piston in response to pneumatic pressure changes in said housing on opposed sides of said diaphragm from a first position wherein said diaphragm is extended to a cup-shape to a second inverted position to actuate said vehicle braking system, and a non-planar annular lip on said piston adjacent an outer surface of said piston releasably retaining said central portion of said diaphragm to said piston contact surface during reciprocal movement of said piston and diaphragm and reducing frictional wear of said diaphragm.

8. The pneumatic brake actuator for a vehicle braking system as defined in claim 7, wherein said annular lip is located on said diaphragm adjacent said outer surface of said piston, said annular lip on said diaphragm receiving said outer surface of said piston during said reciprocal movement and forming a mechanical interlock between said central portion of said diaphragm and said piston during said reciprocal movement thereby reducing frictional wear of said diaphragm.

9. The pneumatic brake actuator for a vehicle braking system as defined in claim 8, wherein said piston includes a generally flat portion including said contact surface and an outer rim portion having an outer edge defining said outer surface of said piston, and said annular lip on said diaphragm located on said generally conical side wall of said diaphragm.

10. The pneumatic brake actuator for a vehicle braking system as defined in claim 9, wherein said annular rim portion of said piston includes an arcuate portion extending away from said diaphragm central portion when said diaphragm is located in said first position and said annular lip is located on an inner surface of said generally conical side wall of said diaphragm when said diaphragm is inverted to said second position, said outer edge of said piston receiving said annular lip of said piston as said piston is reciprocated to said second inverted position forming a mechanical interlock between said piston annular rim portion outer edge and said diaphragm annular lip.

11. A pneumatic brake actuator for a vehicle braking system comprising an enclosed housing including housing members having opposed rim portions, a flexible diaphragm which is cup-shaped in its extended position, including a central portion, a side wall portion surrounding said central portion and a generally radial rim portion extending between said rim portions of said housing members and secured therebetween in sealed relation, and a piston having a contact surface in surface contact with said diaphragm central portion a non-planar outer edge portion, said diaphragm central and side wall portions reciprocable with said piston in response to pneumatic pressure changes in said housing on opposed sides of said diaphragm from a first position, wherein said diaphragm is extending to a cup-shape to a second inverted position to actual said vehicle braking system, and an annular lip on said diaphragm receiving and releasably retaining said non-planar outer edge portion of said piston as said diaphragm is reciprocated from said first position to said second position releasably retaining said piston contact surface in surface contact with said diaphragm central portion and reducing frictional wear of said diaphragm.

12. The pneumatic brake actuator defined in claim 11, wherein said annular lip on said diaphragm is located on an outer surface of said diaphragm when said diaphragm is extended to a cup-shape in said first position, and is then located on an inside surface to receive said outer edge portion of said piston when said diaphragm is inverted in said second position.

13. The pneumatic brake actuator for a vehicle braking system as defined in claim 12, wherein said piston includes a generally flat contact surface and an annular rim portion having an outer edge defining said outer edge portion of said piston.

14. The pneumatic brake actuator for a vehicle braking system as defined in claim 13, wherein said piston annular rim portion includes an arcuate portion extending away from said central portion of said diaphragm when said diaphragm is located in said first position.

\* \* \* \* \*